Figure 1:
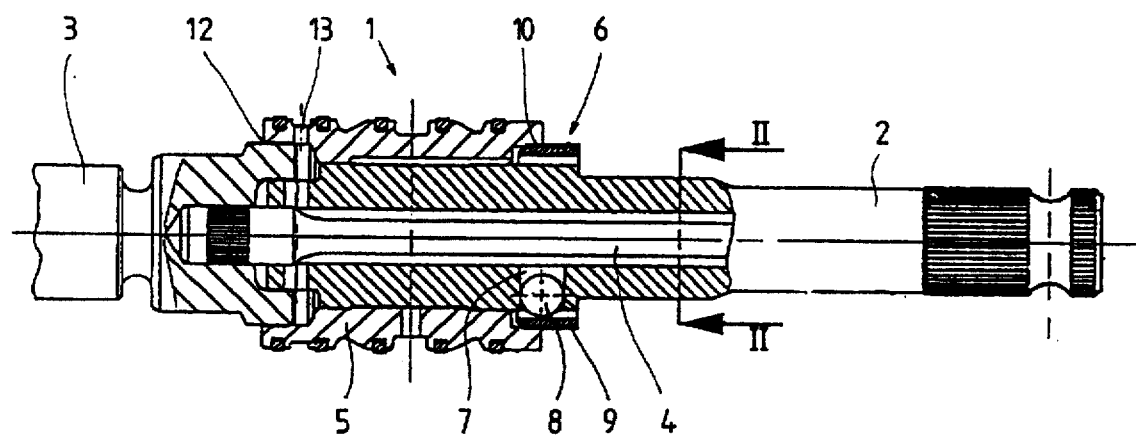

United States Patent [19]

Pfeifer

[11] Patent Number: 5,697,400

[45] Date of Patent: Dec. 16, 1997

[54] STEERING VALVE

[75] Inventor: Arnd Pfeifer, Willich, Germany

[73] Assignee: TRW Fahrwerksysteme GmbH & Co. KG, Dusseldorf, Germany

[21] Appl. No.: 496,767

[22] Filed: Jun. 29, 1995

[51] Int. Cl.$^6$ .................... F15B 9/08; F15B 13/04
[52] U.S. Cl. .................... 137/625.24; 91/375 A; 180/421; 137/625.23
[58] Field of Search .................... 91/375 A; 180/421, 180/423; 137/625.23, 625.24

[56] References Cited

U.S. PATENT DOCUMENTS

| | | | |
|---|---|---|---|
| 3,998,131 | 12/1976 | Adams | 91/375 A X |
| 4,445,422 | 5/1984 | Bishop . | |
| 4,601,358 | 7/1986 | Kozuka et al. | 91/375 A X |
| 4,759,420 | 7/1988 | Schipper et al. | 91/375 A X |
| 4,796,715 | 1/1989 | Futuba et al. | 91/375 A X |
| 4,844,118 | 7/1989 | Kervagoret . | |
| 5,016,723 | 5/1991 | Sand | 91/375 A X |
| 5,058,696 | 10/1991 | Prebay et al. | 91/375 A X |
| 5,190,119 | 3/1993 | Nomura et al. | 91/375 A X |
| 5,230,273 | 7/1993 | Fraley, Jr. . | |
| 5,233,906 | 8/1993 | Bishop et al. | 91/375 A X |

FOREIGN PATENT DOCUMENTS

| | | |
|---|---|---|
| 3626101 | 2/1987 | Germany . |
| 3739848 | 6/1988 | Germany . |
| 3690102 | 6/1991 | Germany . |
| 4139506 | 6/1992 | Germany . |
| 4315895 | 11/1994 | Germany . |
| WO92/20561 | 11/1992 | WIPO . |

*Primary Examiner*—Gerald A. Michalsky
*Attorney, Agent, or Firm*—Tarolli, Sundheim, Covell, Tummino & Szabo

[57] ABSTRACT

In order to be able to more simply manufacture and center a steering valve consisting of an input shaft, an output shaft, a valve sleeve surrounding the input shaft, and a reaction arrangement to which pressure can be applied to generate a centering moment, where the steering valve can simultaneously be of a shorter configuration than a conventional steering valve, it is proposed that the hydraulic lines for the system or operating pressure, as well as for tank return, be formed between the input shaft (2) and valve sleeve (5) and that the reaction arrangement (6) exerts a radial pressure acting between the input shaft (2) and the valve sleeve (5).

6 Claims, 1 Drawing Sheet

STEERING VALVE

The invention pertains to a steering valve for supplying hydraulic pressure to a final control element, which consists of an input shaft, an output shaft, a valve sleeve surrounding the input shaft and a reaction arrangement to which can be applied pressure to generate a centering moment. The steering valve described above is used, in particular, in power-assisted steering systems. An input shaft coupled to a steering rod operates, through a hydraulic system, together with a valve sleeve surrounding the former, which valve sleeve for its part is coupled to an output shaft provided with a pinion. The pinion acts on the steering rack of the steering mechanism. A pump pumps hydraulic fluid under pressure through the system. When there is relative torsion of the input shaft with respect to the valve sleeve, hydraulic pressure is supplied to a hydraulic motor, which supports the movement of the steering rack in one of the two possible directions. A reaction arrangement to which pressure can be applied is arranged in the system in order to generate a centering moment. For this purpose, a reaction piston is conventionally used to which a compression spring is applied, to which in addition, e.g., hydraulic pressure can be applied in accordance with the speed, by which means the torque, for twisting the input shaft relative to the valve sleeve, to be overcome is varied as a function of speed. This type of previously known reaction piston is kept from rotating with respect to the input shaft by means of ball bearings guided in longitudinal grooves arranged on the input shaft. Furthermore, the reaction piston is prestessed in the direction of the valve sleeve by means of a compression spring. A so-called extension piston is arranged on the end face of the valve sleeve facing the reaction piston; the former, together with the opposing end face of the reaction piston forms a resilient torsional slaving. V-shaped grooves, in which ball bearings are inserted, are arranged for this purpose on the opposing end faces of both the expansion piston and the reaction piston. If a torque is applied to the input shaft, the moment is transferred by means of the reaction piston and resilient torsional slaving to the valve sleeve. By means of the ball bearings of the resilient torsional slaving, called a ball bearing coupling, arranged in the V-shaped grooves, the torque is converted to an axial force that acts against the force of the spring which is applied to the reaction piston. As soon as this axial force generated by the ball bearing coupling exceeds the opposing spring force, the reaction piston moves away from the valve sleeve in the axial direction, enabling a relative torsion between the input shaft and valve sleeve. A variable torque can be generated by applying an adjustable hydraulic pressure to the side of the reaction piston opposite the spring. Apart from the coupling, which is in itself inadequate, between the input shaft, in which longitudinal grooves must be machined creating a mechanical weakening and greater production expense, and the reaction piston, a groove/ball bearing arrangement that permits axial movement of the reaction piston with respect to the input shaft while preventing a relative torsion of the reaction piston with respect to the input shaft, is practically impossible to manufacture without play. In addition, the many different individual elements must be assembled in a basic mechanical setup, which is difficult due to the many parts that are movable with respect to one another. Moreover, sealing is difficult, since the top surface of the reaction piston must be sealed against the tank return guided by the input shaft. The hydraulic lines for the system or operating pressure are customarily guided between the valve sleeve and the input shaft, while at least the tank return line is guided through the input shaft. Reaction elements dependent on hydraulic pressure are applied with a pressure from the outside, through special lines. If, for example, a reaction piston, to which a pressure is applied a means of a flat helical spring, is used for centering, the resultant prestress of the reaction piston depends on the quality of the valve subassembly. An undesirable dispersion of the set spring prestress occurs. Also, because of the use of the flat helical spring, the spring force is not concentric with the reaction piston. Twisting of the valve occurs as a consequence, which results friction being applied to the input shaft and problems with hysterisis. Apart from the aforementioned disadvantages such as the difficulty of mechanical adjustment, great component expense and the difficulty of hydraulic sealing, a disadvantage of previously known steering valves of the generic class consists in the fact that, due to the additional reaction elements operating essentially axially, the size, in particular, the length cannot be reduced. Starting from this point, the underlying purpose of the invention is to improve a steering valve of the generic class by avoiding the aforementioned disadvantages and making the steering valve more economical to manufacture and assemble, practically maintenance-free, and not susceptible to disturbance such that it can be reduced in size with respect to the length, compared to conventional steering valves. In order to solve this technical problem, a steering valve of this generic class is improved by forming the hydraulic lines for the system or operating pressure, as well as the tank return, between the input shaft and valve sleeve and by having the reaction element exert a radial force between the input shaft and the valve sleeve. First and foremost, the arrangement of a reaction element operating in radially makes any requirement of components for converting the torque to an axial force unnecessary. Moreover, mechanical adjustment is simplified considerably, since components must no longer be simultaneously set relative to one another in an angular and axial position. The reaction arrangement operating in the radial direction can be positioned between the input shaft and valve sleeve such that the steering valve can be executed as a considerable reduction of conventional steering valves. Furthermore, sealing is simplified. Through the arrangement of the hydraulic lines and tank return between the input shaft and valve sleeve, no additional sealing is required in order to seal additional building elements, such as conventional reaction elements. It is proposed that pressure be applied by means of a spring element to the reaction element exerting a radial force. A simple mechanical centering of the steering valve can be achieved in this way. A spring-applied reaction element exerts a radial force between the input shaft and valve sleeve. Thus, for example, the simple configuration of a lifter path on the inner wall of the valve sleeve can achieve a separation between high pressure and low pressure areas, which enables centering. It is proposed that hydraulic pressure be applied to the reaction element. This measure enables the force acting in the radial direction to be regulated in accordance with hydraulic pressure parameters, e.g., in accordance with speed. According to one proposal of the invention, a control pressure is applied to the reaction element which is supplied through a hole axially drilled through the input shaft. It is proposed that the reaction element feature at least one piston arranged between the input shaft and the valve sleeve. According to an alternate proposal of the invention, it is proposed that the reaction element feature ball bearings arranged between the input shaft and valve sleeve. Like the piston, these can be moved radially in accordance with pressure. It is proposed that the ball bearings be arranged on the side of the valve sleeve in a hexagonal ring. For example, three ball bearings can be arranged in corresponding grooves or drilled holes in the input shaft and retained on the valve sleeve side in a hexagonal ring as proposed. Under the application of pressure, the ball bearings exert a torque on the hexagonal ring until each of the ball bearings comes to rest in a corner of the hexagon. Twisting the input shaft with respect to the valve sleeve then requires a torque that generates a force which exceeds the pressure acting on the ball bearings. The ball bearings are advantageously arranged in the input shaft in drilled holes configured at angles of 120° with respect to one another in the radial plane of the input shaft. According to one proposal of the invention, the input shaft and output shaft are coupled to one another by means of a torque rod. The steering valve according to the invention is distinguished by the fact that it can be assembled using a very simple centering method. For assembly, the reaction element that exerts a force in the radial direction need only be brought under pressure after insertion such that the neutral torsional position between the valve sleeve and input shaft occurring based on the radial force can be set, which corresponds to a purely mechanical maximum disengaging position of the movable components of the reaction element. Then, for example, the hexagonal ring can be stopped relative to the valve sleeve, by which means the steering valve is mechanically set. The use of simple reaction elements makes the manufacture of the steering valve according to the invention very economical and simple. If, for example, ball bearings are used that can be inserted in drilled holes in the input shaft and that run in a hexagonal ring that is connected to the valve sleeve, the aforementioned components are already the only additional components. Sealing is simplified considerably because of the separation of the [supply ] line areas between the input shaft and valve sleeve and the guiding, as needed, of control pressure through the hole axially drilled through the input shaft. In the simplest embodiment, spring-loaded ball bearings can be arranged between the input shaft and valve sleeve, where the inner wall of the valve sleeve is configured, for example, in the manner of a hexagonal ring. This achieves a centering of the steering valve such that conventional torsional elements are no longer required. In a further configuration, the ball bearings can be inserted loosely into drilled holes in the input shaft and guided, on the valve sleeve side, in a path in the shape of a hexagonal ring. The control pressure guided through the interior of the input shaft then first achieves, when there is a build-up of pressure, a positioning of the valve in the neutral setting. In order to produce a leak-free connection between the output shaft and control sleeve, the latter can be pressed together in a hydraulically balanced position.

Figure 2:
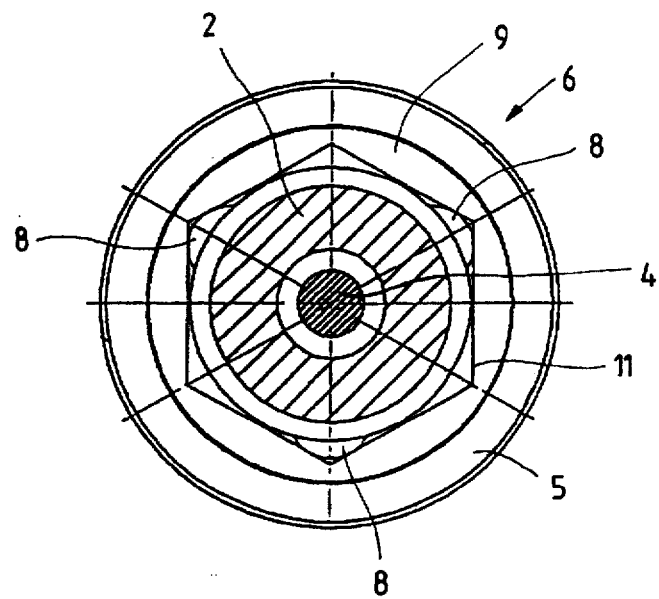

Additional advantages and features of the invention are explained in the following description with the help of the figures. These show:

FIG. 1: a schematic side view in partial section of an embodiment of a steering valve; and FIG. 2: a section along line II—II of FIG. 1.

The steering valve (1) shown in the figures comprises an input shaft (2), which is coupled to a steering linkage, not shown, and an output shaft (3), which is coupled to a steering rack by means of a pinion, not shown. The input shaft (2) and the output shaft (3) are coupled together by means of a torque rod (4). The output shaft (3) is coupled to a valve sleeve (5) that surrounds the input shaft (2). The valve sleeve (5) can also be formed, according to the structural configuration, integrally with the output shaft (3).

The hydraulic lines for the system or operating pressure and tank return are guided between the input shaft (2) and the valve sleeve (5). A reaction arrangement (6) is arranged between the input shaft (2) and the valve sleeve (5); the former is used to exert radial force. In the embodiment shown, a hexagonal ring (9) is arranged at the free end of the valve sleeve (5) and coupled to the valve sleeve (5) at the connection (10). In the area with which the input shaft (2) is arranged within the hexagonal ring (9), drilled holes (7) are made in the input shaft (2), and ball bearings (8) are inserted. The ball bearings (8) move along the hexagonal path (11) inside the hexagonal ring (9). A drilled hole (13) is arranged behind the hydraulic tight connection (12) between the valve sleeve (5) and output shaft (3); control pressure can be guided, by means of the former, to the interior of the input shaft. This control pressure acts the surfaces of the ball bearings (8) facing the inside of the input shaft (2), and presses them outward. Under pressure, the ball bearings tend to move into the corners of the hexagonal path (11), centering the valve. According to the control pressure, a torque is required that corresponds to the relative torsion of input shaft (2) with respect to the valve sleeve (5), by which means the ball bearings (8) must be pressed into the drilled holes in the input shaft against the radial pressure acting them, in order to move along the hexagonal path (11). The torque that is dependent on pressure consequently demands a pressure-dependent control force. As a result, the steering force can be determined in accordance with various parameters, e.g., speed. The ends of the hexagonal ring not occupied by ball bearings are used to form return lines. For assembling the steering valve shown, the individual components need only to be positioned relative to one another in the axial direction. The valve sleeve can then be hydraulically centered with respect to the input shaft through the application of a system pressure. Then the valve sleeve (5) can be connected to the connection (12), e.g., by being pressed with the output shaft (3). The steering valve (1) should then be mechanically centered. If, in addition to the system pressure, other means are used to prestress the bearings (8), such as springs or the like, the torque rod (4) may possibly be omitted. The fact that reaction elements acting in the axial direction are not required leads not only to the reduction in the minimum number of components, but also the ability to shorten the structural length.

LIST OF REFERENCE NUMERALS

1 Steering valve
2 Input shaft
3 Output shaft
4 Torque rod
5 Valve sleeve
6 Reaction arrangement
7 Drilled hole
8 Ball bearing
9 Hexagonal ring
10 Connection
11 Hexagonal path
12 Connection
13 Drilled hole

I claim:

1. A steering valve for supplying hydraulic pressure to a final control element, said steering valve comprising:
   an input shaft;
   an output shaft;
   a valve sleeve surrounding the input shaft; and
   a reaction arrangement to which a radial hydraulic pressure force can be applied to generate a centering moment acting on the input shaft;

characterized in that:

the reaction arrangement includes a ring fixedly attached to the valve sleeve and three equally circumferentially spaced ball bearings arranged between the input shaft and the valve sleeve, the ring having a hexagonal inner surface, the ball bearings being moved into respective alternating corners of the hexagonal inner surface of the ring under said hydraulic pressure force; and hydraulic lines for operating pressure, as well as for tank return, are formed between the input shaft (2) and the valve sleeve (5), the tank return lines being formed in the corners of the hexagonal inner surface of the ring which are not occupied by the ball bearings.

2. The steering valve described in claim 1, characterized in that hydraulic pressure is applied to the reaction arrangement.

3. The steering valve described in claim 2, characterized in that a control pressure is applied to the reaction arrangement.

4. The steering valve described in claim 3, characterized in that the control pressure is supplied through a hole extending axially through the input shaft (2), the control pressure acting radially outward on the reaction arrangement.

5. The steering valve described in claim 1, characterized in that the input shaft (2) is coupled to the output shaft (3) by a torque rod (4).

6. The steering valve described in claim 1, characterized in that the valve sleeve is pressed onto the output shaft.

* * * * *